United States Patent [19]
Couturier et al.

[11] 3,952,163
[45] Apr. 20, 1976

[54] METHOD AND APPARATUS FOR TESTING IN FDM SYSTEM

[75] Inventors: Robert A. Couturier, Stamford; Steven J. Davis, Ridgefield; G. Howard Robbins, New Canaan, all of Conn.

[73] Assignee: General DataComm Industries, Inc., Norwalk, Conn.

[22] Filed: Mar. 3, 1975

[21] Appl. No.: 554,773

Related U.S. Application Data

[62] Division of Ser. No. 246,589, April 24, 1972, Pat. No. 3,869,577.

[52] U.S. Cl. ............................ 179/15 BF; 179/2 DP; 179/175.3 R
[51] Int. Cl.² ........................................... H04M 11/00
[58] Field of Search ........ 179/15 BF, 2 DP, 175.3 R

[56] References Cited
UNITED STATES PATENTS

| | | | |
|---|---|---|---|
| 3,655,915 | 4/1972 | Liberman et al. | 179/175.3 R |
| 3,692,939 | 9/1972 | Knight et al. | 179/175.3 R |
| 3,743,938 | 7/1973 | Davis | 179/15 BF |
| 3,769,454 | 10/1973 | Liberman et al. | 179/175.3 R |

*Primary Examiner*—Douglas W. Olms
*Attorney, Agent, or Firm*—Pennie & Edmonds

[57] ABSTRACT

A data communication system is described in which dial access control signals such as RING, DATA SET READY, DATA TERMINAL READY, CARRIER DETECT, and OUT OF SERVICE are transmitted between a central processing unit (CPU) and remote terminals in the form of frequency-modulated signals. A special frequency signal is transmitted from a remote terminal whenever a RING or DATA SET READY control signal is present and a CARRIER DETECT signal is not. Preferably, this special frequency is midway between the center frequency used for data communication and the frequency of either the MARK or the SPACE signal. Upon reception, this special frequency signal is processed in a particular fashion to generate signals comparable to the RING or DATA SET READY signals of the prior art. DATA TERMINAL READY and CARRIER DETECT control signals are transmitted as carrier signals and the OUT OF SERVICE signal is transmitted as a center frequency signal. Suitable processing at the receiver forms these signals into signals comparable to those of the prior art. Advantageously, the OUT OF SERVICE signal is used with appropriate apparatus to initiate testing of the remote terminal. Circuitry in this apparatus permits one to switch repeatedly from testing of just an FDM transmitter/receiver in the remote terminal to testing of both the FDM transmitter/receiver and a modem.

7 Claims, 21 Drawing Figures

METHOD AND APPARATUS FOR TESTING IN FDM SYSTEM

This is a division, of application Ser. No. 246,589, filed Apr. 24, 1972 now U.S. Pat. No. 3,869,577.

BACKGROUND OF THE INVENTION

This concerns a data communication system using frequency division multiplexing (FDM) and, in particular, a method and apparatus for control signaling in such a system.

A specific use for our invention is in private line data networks in which several remote terminals are connected over narrow band private lines to a central processing unit (CPU). Such a system typically is used in conjunction with a public telephone network, such as that of the Bell System, to provide groups of telephone subscribers in each of several localities with low-cost, long-distance data links to a centrally located computer. Thus, the whole system comprises a multitude of subscriber telephone and data sets, a public telephone network, several remote terminals, a private line network, and a central processing unit.

As is well known, data is transmitted over conventional public telephone networks in the form of pulses of certain frequencies. At the transmitter, a modulating device called a data set, or modem, is used to convert a DC signal representative of a stream of digital data, which may be received from any type of digital data processing machine, into an AC signal representative of this same stream of digital data. At the receiver, another modem converts received AC signals back to digital DC signals. Ordinarily, data communication takes place in both directions on a telephone line and each modem is equipped both to convert DC signals to AC signals that are transmitted and to convert received AC signals to DC signals. Thus, in a typical data communication system, each subscriber has at least one modem transmitter/receiver and each remote terminal of a private line data netwwork has at least one modem transmitter/receiver.

In modems that are presently used with data communication systems, one of the two DC levels that represents digital data is converted by a modem to an AC signal having a first frequency; while the other level of the DC signal is converted to an AC signal having a second frequency. It is conventional in the art to refer to one of these DC levels and the corresponding AC frequency as a SPACE or 0, and to the other DC level and the corresponding AC frequency as a MARK or 1. To minimize interference between signals that are transmitted from a terminal and the signals that are received at that terminal and to permit communication between more than two terminals, it is customary for a modem to transmit MARK and SPACE signals at frequencies that are centered about a first center frequency and to receive MARK and SPACE signals at frequencies that are centered about a second center frequency.

Extensive description of the operation of modems may be found in James Martin's book *Telecommunications and the Computer*, (Prentice Hall, 1969); in patent application Ser. No. 194,270, now U.S. Pat. No. 3,769,454, filed Nov. 1, 1971 by R. A. Liberman, W. C. Bond, and E. J. Soltysiak, entitled "Method and Apparatus for Testing Teletypewriter Terminals," and assigned to General DataComm Industries, Inc.; and in the Bell System Data Communications Technical Reference entitled "Characteristics of Teletypewriter Exchange Service," (September, 1970) available from: Engineering Director — Data Communications, American Telephone and Telegraph Company, 195 Broadway, New York, N.Y. 10007.

Data is transmitted over the private line portion of the data communication network by methods such as frequency division multiplexing (FDM) that allow several phone calls to be conducted simultaneously over a single private line. In an FDM system, this is accomplished by transmitting each call within a specified frequency channel on the private line. At the remote terminal, an FDM transmitter/receiver converts DC signals from the remote terminal modem to signals having frequencies within the specified frequency channel; and it converts signals received from the CPU to DC signals that are applied to the remote terminal modem. A second FDM transmitter/receiver, which may be termed a local FDM, is located adjacent the CPU. This local FDM transmitter/receiver converts signals received from the remote FDM to DC signals that are applied to the CPU; and it also converts signals from the CPU to signals having frequencies within the frequency channel assigned for transmisssion to the remote FDM. The local FDM also performs interfacing required between the data communication system and the CPU. Extensive discussion of frequency division multiplexing may be found in the above-referenced *Telecommunications and the Computer*. As will be evident to those skilled in the art, the modulating and demodulating functions of an FDM transmitter/receiver are analogous to those of a modem.

In addition to converting signals from DC to AC and vice versa, modems provide control means for the communication system. Typical control signals of interest are: a DATA TERMINAL READY signal that indicates to a remote terminal modem that the CPU is prepared to receive data transmission from that modem; a RING signal that is a request from a subscriber's modem for a connection to the CPU; a DATA SET READY signal that indicates to the CPU that the remote terminal modem has answered a telephone call in response to a RING signal and is prepared to receive information from the subscriber's modem; an OUT OF SERVICE signal that indicates that the CPU is not operating; and a CARRIER DETECT that indicates the reception of the carrier signal at some point in the system. Because these signals are needed to connect the private line to the dial-operated public telephone network, these signals are referred to in the art as dial access controls. Also of interest in the discussion below is an ENERGY DETECT signal that indicates the reception of signal energy at some point in the system.

In prior art data communication systems, dial access control signals are transmitted over a private line between the CPU and the remote terminal modem as amplitude-modulates signals. This, however, creates problems in a narrow band channel such as that used for private line data communications. Specifically, the bandwidth of the amplitude-modulated control signals is sufficiently broad that distortion is created at the edges of the channel. This, in turn, makes it difficult to detect the control signals reliably.

SUMMARY OF THE INVENTION

To provide for more reliable and more readily implemented dial access control signaling, we have devised a data communication system in which control signals are transmitted between the CPU and the remote terminals as frequency-modulated signals. Specifically, we transmit RING and DATA SET READY control signals at a special frequency midway between the center frequency used for data communication and the frequency of either the MARK or SPACE signal. When these special frequency signals are received, we process them in a particular fashion in an FDM transmitter/receiver to generate signals comparable to the RING or DATA SET READY signals of the prior art. Other control signals such as DATA TERMINAL READY and CARRIER DETECT control signals are transmitted as carrier signals and OUT OF SERVICE is transmitted as a center frequency signal. These signals are also processed upon reception to form signals comparable to the DATA TERMINAL READY, CARRIER DETECT, and OUT OF SERVICE signals of the prior art.

For testing purposes, circuitry in this apparatus permits one to switch repeatedly from testing or just an FDM transmitter/receiver in the remote terminal to testing of both the FDM transmitter/receiver and a modem.

BRIEF DESCRIPTION OF THE DRAWING

These and other objects, features, and elements of our invention will be more readily apparent from the following detailed description of the drawing in which.

DETAILED DESCRIPTION OF THE INVENTION

Figure 1:
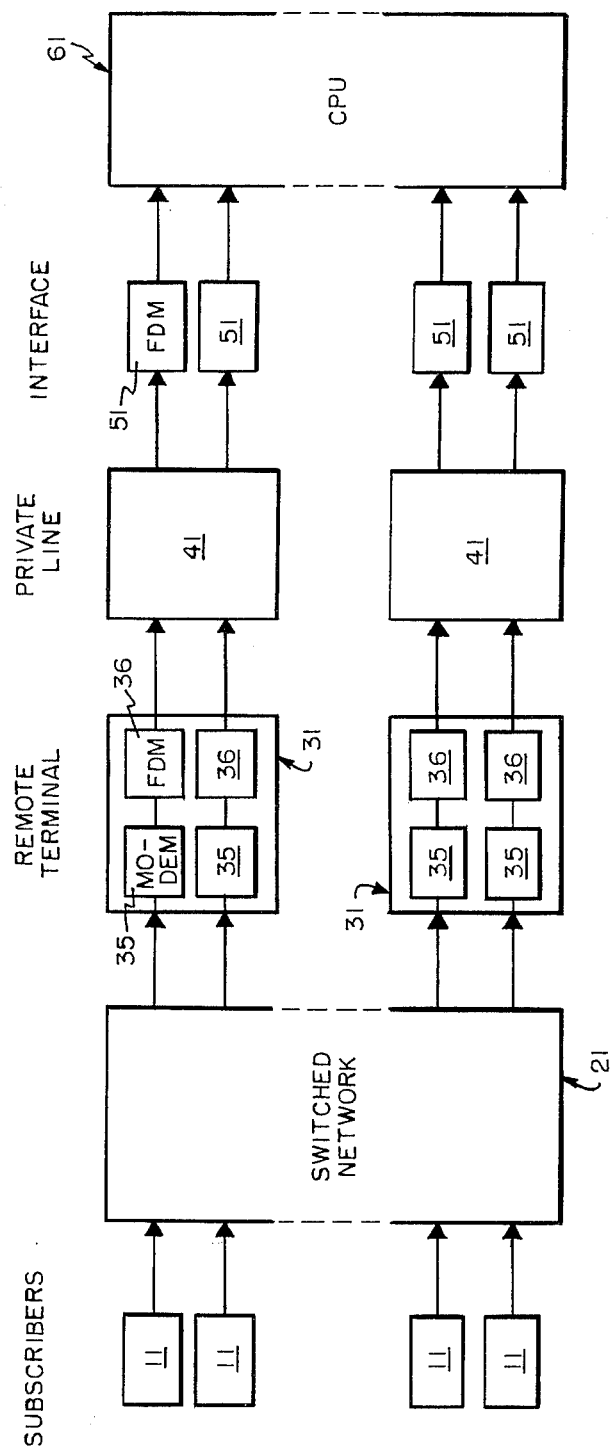
FIG. 1 is a block diagram of a typical communication system according to our invention.

FIG. 1 illustrates a typical communication system formed according to our invention. In this system, a multitude of subscriber stations 11 are connected by means of a public telephone network 21 to several remote terminals 31. The remote terminals 31 are connected by private lines 41 and FDM transmitter/receivers 51 to a central processing unit (CPU) 61. Typically, each subscriber station 11 has a telephone set and a modem. Each remote terminal 31 contains at least one pair of a modem 35 and an FDM transmitter/receiver 36.

This arrangement of apparatus permits each of several subscribers in one locality to be connected simultaneously with a different modem 35 in the same remote terminal 31 and to communicate with CPU 61 over the same private line 41. Because different frequency channels are used in private line 41 for each subscriber's communication, there is no interference between the subscribers under normal operating conditions. Simultaneously, other subscribers in other localities may also be connected with CPU 61 by means of other remote terminals 31 and private lines 41.

The telephone sets and modems used in our invention are conventional. They may for example be standard Bell System telephones and 103-type modems such as those now made by several manufacturers. The FDM transmitter/receivers 36, 51 contain conventional FDM transmitting and receiving equipment. In addition, they contain specific apparatus to be described below for the formation and processing of control signals according to our invention.

To complete a connection between a subscriber station and the CPU, some data communication systems transmit to the CPU the RING signal received at a remote terminal modem. Others do not. To provide for these two possibilities, we have devised FDM transmitter/receiver apparatus in which various elements are wired, or strapped, in one fashion if the system transmits the RING signal and in a second fashion if it does not. For convenience, the apparatus that does not transmit the RING signal is discussed first in conjunction with the block diagrams of FIGS. 2 and 3 and the waveforms of FIG. 4.

Before describing this apparatus, however, it is useful to review in conjunction with FIG. 1 the signaling during a typical call sequence. Initially, CPU 61 indicates that it is prepared to receive data from a given modem 35 by transmitting to it a continuous DATA TERMINAL READY signal. When a call is received from a subscriber station 11, modem 35 answers the call and sends a continuous DATA SET READY signal to CPU 61. Then a "handshaking" procedure is initiated to establish a proper connection between station 11 and modem 35. Once this is completed, modem 35 sends a CARRIER DETECT signal to CPU 61 and data communication begins.

A call may be terminated from the remote terminal modem side of the private line by any one of several events that cause the DATA SET READY signal to drop. This is detected in the local FDM transmitter/receiver and relayed to the CPU. The CPU then drops DATA TERMINAL READY. Some time later, the CPU brings this signal up again so it can receive another call.

A call may also be terminated from the CPU side of the private line by dropping the DATA TERMINAL READY signal. This occurrence is transmitted from the local FDM to the remote FDM and is relayed to the remote terminal modem. The call is then dropped. Once the call is dropped, the DATA SET READY signal is turned off. This is detected in the locala FDM and passed to the CPU. At this point, the CPU can raise DATA TERMINAL READY to receive the next incoming call.

Apparatus for implementing the foregoing sequence of signaling is well known in the art. However, as emphasized above, the dial access control signals that are used in the prior art are amplitude-modulated signals; and, as a result, distortion is frequently created in the typical narrow band channel. This, in turn, makes detection of the control signals unreliable.

Figure 2:
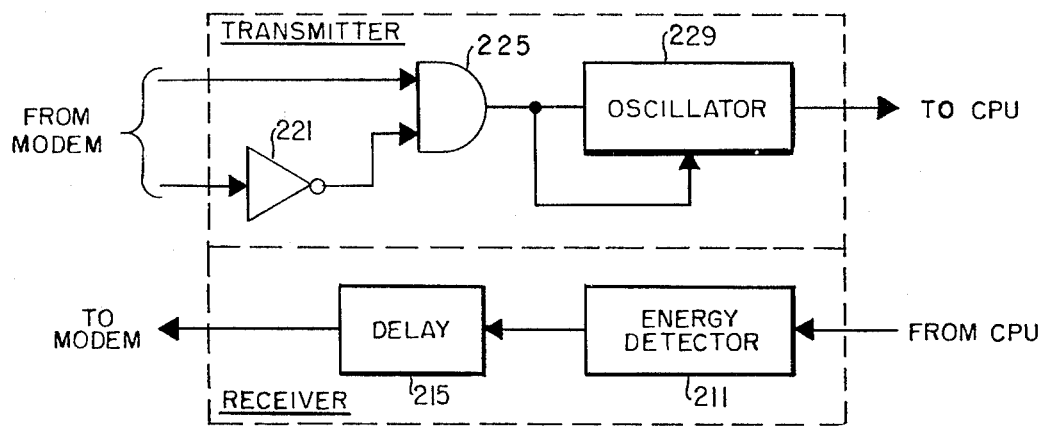
FIG. 2 is a block diagram of portions of a remote FDM transmitter/receiver of a first illustrative embodiment of our invention.
Figure 3:
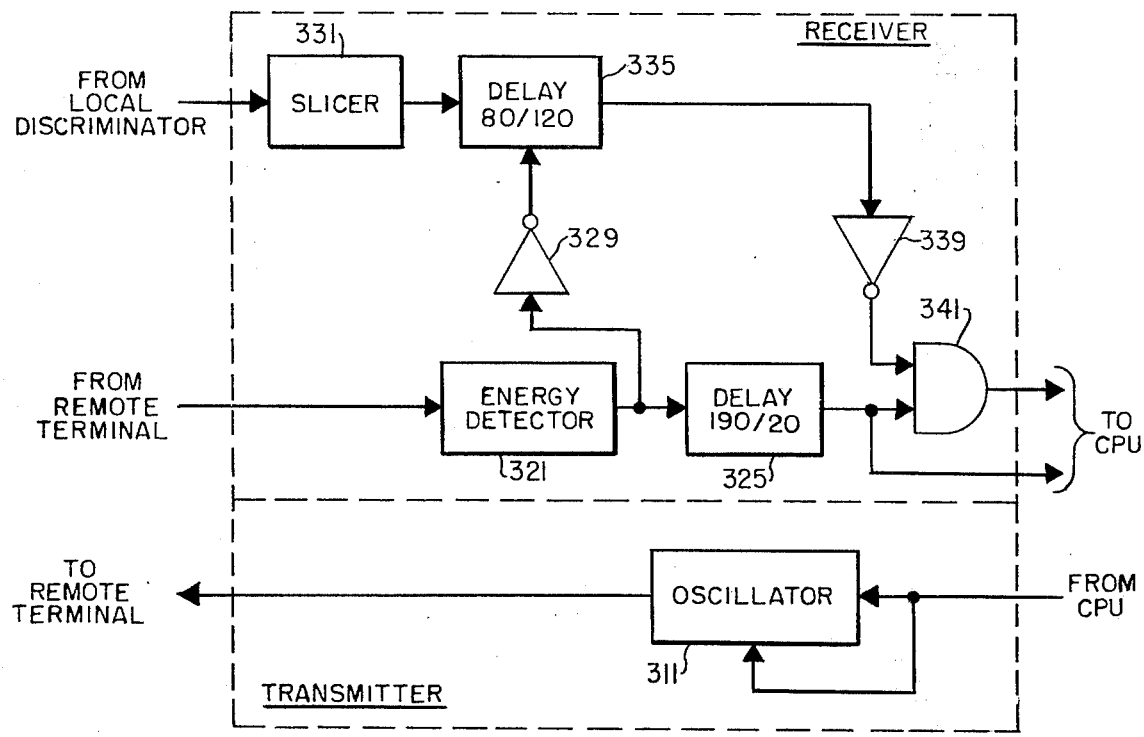
FIG. 3 is a block diagram of portions of a local FDM transmitter/receiver of a first illustrative embodiment of our invention.
Figure 4:
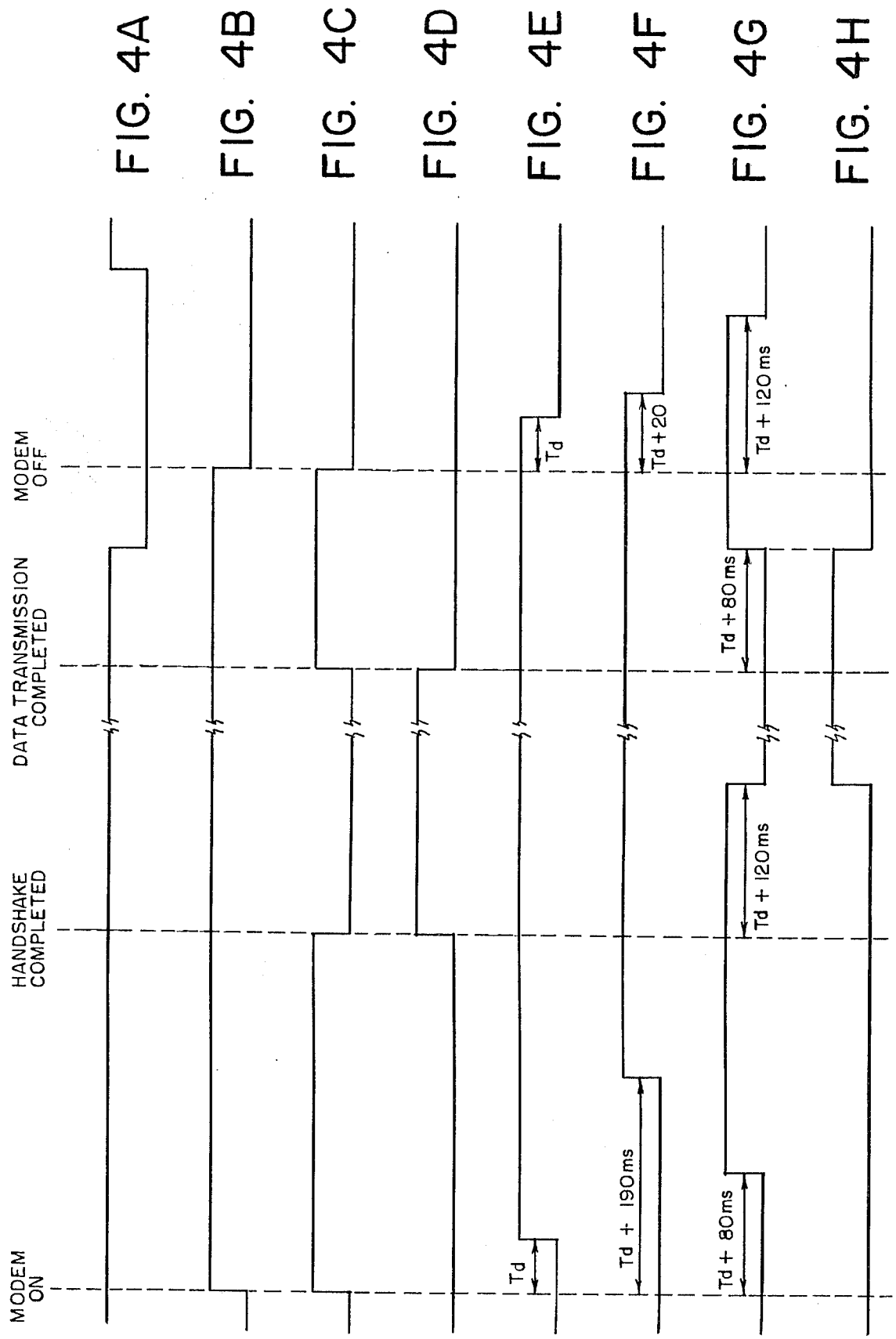
FIGS. 4A–4H depict waveforms useful in understanding the operation of the first illustrative embodiment of our invention.

To make dial access control signal detection more reliable and more efficient, we have modified conventional FDM transmitter/receivers to provide for control signaling by frequency-modulated signals. FIG. 2 depicts an illustrative embodiment of the modified portions of the transmitter and receiver sections of an FDM transmitter/receiver that is used as a remote terminal with frequency-modulated signaling. FIG. 3 illustrates an illustrative embodiment of the modified portions of the transmitter and receiver sections of an FDM transmitter/receiver that is used as a local terminal with frequency-modulated signaling. These FIGS. show only portions of a particular FDM transmitter/receiver because the remaining portions are known to those familiar with the prior art.

In the receiver portion of the remote FDM shown in FIG. 2 are an energy detector 211 that detects signal energy received from the CPU and a delay device 215. This apparatus is conventional. Delay device 215 has a time constant such that it responds to the output of detector 211 in about 190 milliseconds and does not respond to shorter duration signals from detector 211. Accordingly, only when a signal is received for more than 190 milliseconds, does delay device 215 produce an output. As will appear below, this output is a DATA TERMINAL READY signal.

In the transmitter portion of the remote FDM are an inverter 221, an AND gate 225, and an oscillator 229. The signal applied to inverter 221 is a CARRIER DETECT from the modem in the remote terminal. This signal is inverted by inverter 221 and applied to AND gate 225. The other signal applied to AND gate 225 is DATA SET READY, which is also derived from the modem. Because the CARRIER DETECT and DATA SET READY signals are standard signals produced by conventional modems, details of their formation will be known to those skilled in the art.

The output of AND gate 225 is applied to oscillator 229 to produce a special frequency signal that is transmitted over the private line to the local FDM and the CPU. Preferably, this signal is midway between the center frequency of the oscillator and the frequency of either the MARK or the SPACE signal. For convenience, it is assumed below that the special frequency is centered between the center frequency and the MARK frequency. Oscillator 229 may be any one of several well-known oscillators. For example, it may be a voltage-controlled oscillator having an output frequency that varies with its input voltage. In such a case, the signal from AND gate 225 that produces the special frequency has a voltage centered between the voltages used to produce the MARK and center frequency signals. It may be necessary in operating our invention for the signal from AND gate 225 to turn on oscillator 229. This provision is symbolized in FIG. 2 by the arrowhead-tipped line from the output of AND gate 225 to oscillator 229.

FIG. 3 depicts an illustrative embodiment of portions of the local FDM transmitter/receiver. In the transmitter portion of the local FDM is an oscillator 311. This oscillator may be turned on by a DATA TERMINAL READY signal from the CPU. Like oscillator 229, oscillator 311 may be a voltage-controlled oscillator having ana output frequency that varies with input voltage; and the oscillator may be turned on automatically as symbolized by the arrowhead-tipped line. The voltage of the DATA TERMINAL READY signal is such that the output of oscillator 311 is its MARK frequency.

The receiver in the local FDM comprises a signal energy detector 321, a delay device 325, an inverter 329, a slicer 331, a delay device 335, an inverter 339, and an AND gate 341. The signal applied through energy detector 321 is the signal that has been transmitted through the private line. The output of energy detector 321 is applied to delay device 325. Delay device 325 is similar to delay device 215 in that it responds to the output of detector 321 after a fixed period of time and does not respond to signals having a duration shorter than that period of time. Delay device 325, however, has a different time constant for a rising signal than it does for a falling signal. For a rising signal, namely one in which the output of energy detector 321 increases, the time constant of delay device 325 is 190 milliseconds. For a falling signal, the time constant is 20 milliseconds. The output of delay device 325 is applied directly to the CPU as a DATA SET READY signal. The output is also applied to AND gate 341.

The signal from the remote terminal is also processed in the local FDM to convert AC signals to DC signals. In the first step of this conversion process, the received signals are fed to a discriminator (not shown). One of the outputs of this discriminator is applied to slicer 331 which is set to produce an output only when the voltage output of the discriminator lies in a band centered between the output voltages for the MARK and center frequency signals. For example, if the output voltage of a MARK signal is 3 volts and the output voltage for a center frequency signal is 0 volts, slicer 331 will produce an output only if the output signal from the local discriminator lies between 1 and 2 volts.

The output of slicer 331 is applied to delay device 335 which is similar to delay device 325. However, its rising signal time constant is 80 milliseconds and its falling signal time constant is 120 milliseconds. Together, slicer 331 and delay device 335 constitute a special frequency detector. The output of the delay device 335 is then inverted by inverter 339 and applied to AND gate 341. Because the rising signal time constant of delay device 335 is less than that of delay device 325 while its falling signal time constant is greater than that of delay device 325, AND gate 341 has no output whenever the special frequency is being sent. Consequently, the output of AND gate 341 is a CARRIER DETECT signal similar to that applied to inverter 221 in the transmitter of the remote FDM. This CARRIER DETECT signal from AND gate 341 is applied to the CPU. When energy is not received from the remote terminal, a reset signal from energy detector 321 is inverted by inverter 329 and applied to delay device 335 to reset that portion of delay device 335 that monitors the duration of a rising signal.

The operation of the remote terminal FDM and the local FDM may be understood with the aid of the waveforms shown in FIGS. 4A–4H. Initially, the CPU indicates that it is prepared to receive data from a remote terminal by transmitting to the local FDM transmitter a DATA TERMINAL READY signal shown in FIG. 4A. This signal turns on oscillator 311 and causes it to transmit a signal to the remote terminal. At the remote terminal, this signal is detected by energy detector 211 in the remote FDM receiver. If the signal persists long enough, delay device 215 passes a DATA TERMINAL READY signal to the modem in the remote terminal. In known fashion, this turns on the modem and permits it to receive an incoming call.

To indicate that the modem is prepared to receive a signal, a DATA SET READY signal shown in FIG. 4B is applied from the modem to AND gate 225. This indicates that the modem has been connected to the telephone network. If, at the same time, a carrier signal is not detected by the modem, AND gate 225 is enabled because the CARRIER DETECT signal is inverted by inverter 221. The output of AND gate 225 turns on oscillator 229 and causes a special frequency signal shown in FIG. 4C to be transmitted to the CPU. Once a call is received and the handshaking procedure completed, data transmission begins as shown in FIG. 4D. This causes the CARRIER DETECT signal to change its state, thereby disabling AND gate 225 and terminating the transmission of the special frequency signal.

After a transmission delay, $T_d$, the signal transmitted from the remote FDM transmitter is received at the local FDM receiver. This signal as received is shown in FIG. 4E. This signal is detected by energy detector 321 and applied to delay device 325. There it is delayed for 190 milliseconds and the output signal shown in FIG. 4F is applied to the CPU as a DATA SET READY signal and to AND gate 341.

The signal received from the remote terminal is also applied to a discriminator and the output of this discriminator is applied to slicer 331 and delay device 335 to detect the special frequency. After an 80 millisecond delay, the output of delay device 335 as shown in FIG. 4G is applied to inverter 339. There it is inverted and applied to AND gate 341. As a result, a CARRIER DETECT signal shown in FIG. 4H is applied from AND gate 341 to the CPU only when there is signal energy being transmitted from the remote terminal that is not a special frequency signal.

When data transmission is ended as shown in FIG. 4D, the CARRIER DETECT signal at the remote FDM transmitter changes its state to enable AND gate 225. This causes oscillator 229 to transmit the special frequency to the CPU. At the local FDM receiver, the special frequency is detected by slicer 331 and delay device 335; and after a delay of 80 milliseconds, a signal shown in FIG. 4G is applied to inverter 339. This inverted signal disables AND gate 341 and terminates the CARRIER DETECT signal shown in FIG. 4H that is applied from AND gate 341 to the CPU.

Sometime after the CPU detects the change in the CARRIER DETECT signal, it drops the DATA TERMINAL READY signal shown in FIG. 4A. This turns off oscillator 311 thereby terminating the transmission of the FDM carrier. After a transmission delay, the failure of the carrier frequency is detected by energy detector 211 and the DATA TERMINAL READY signal from delay device 215 is terminated. This causes the modem to terminate the phone call and the transmission of the DATA SET READY signal, thereby disabling AND gate 225. As a result, transmission of the special frequency from oscillator 229 ceases as shown in FIG. 4C.

After the transmission delay, $T_d$, the absence of all signal energy is detected by energy detector 321; and the falling signal from energy detector 321 is monitored for 20 milliseconds in delay device 325. If no energy is detected in that time, the DATA SET READY signal shown in FIG. 4F goes off. Simultaneously, AND gate 341 is disabled.

While this is going on in the signal energy detecting circuitry, the special frequency is also being detected by slicer 331 and delay 335. When the special frequency terminates, however, the termination of the output signal from delay device 335 is delayed for 120 milliseconds. Because the signal from delay device 335 is delayed considerably more than the signal from delay device 325, there is no risk of AND gate 341 becoming enabled during the call termination procedure.

At this point, the telephone call is terminated. When the computer is ready to receive another call, another DATA TERMINAL READY signal is shown in FIG. 4A may be presented to oscillator 311 and the whole process may be repeated.

Figure 5:
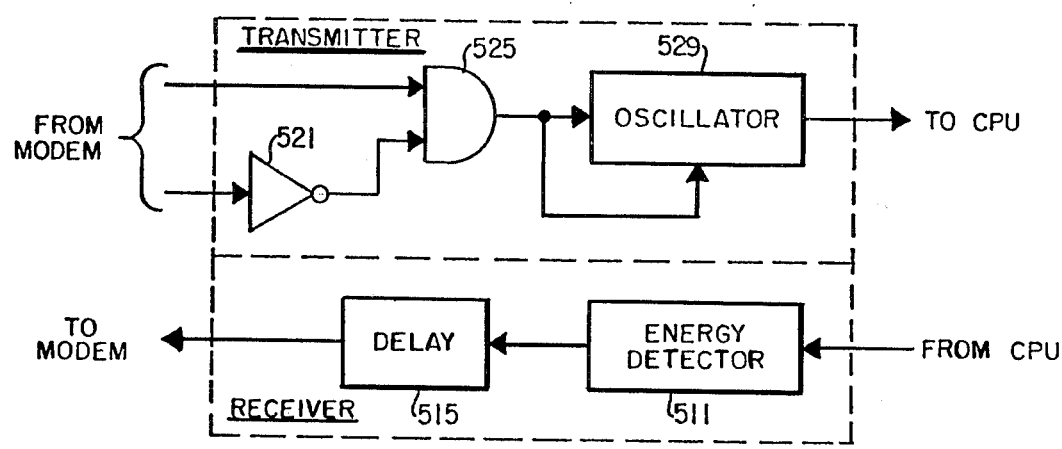
FIG. 5 is a block diagram of portions of a remote FDM transmitter/receiver of a second illustrative embodiment of our invention.
Figure 6:
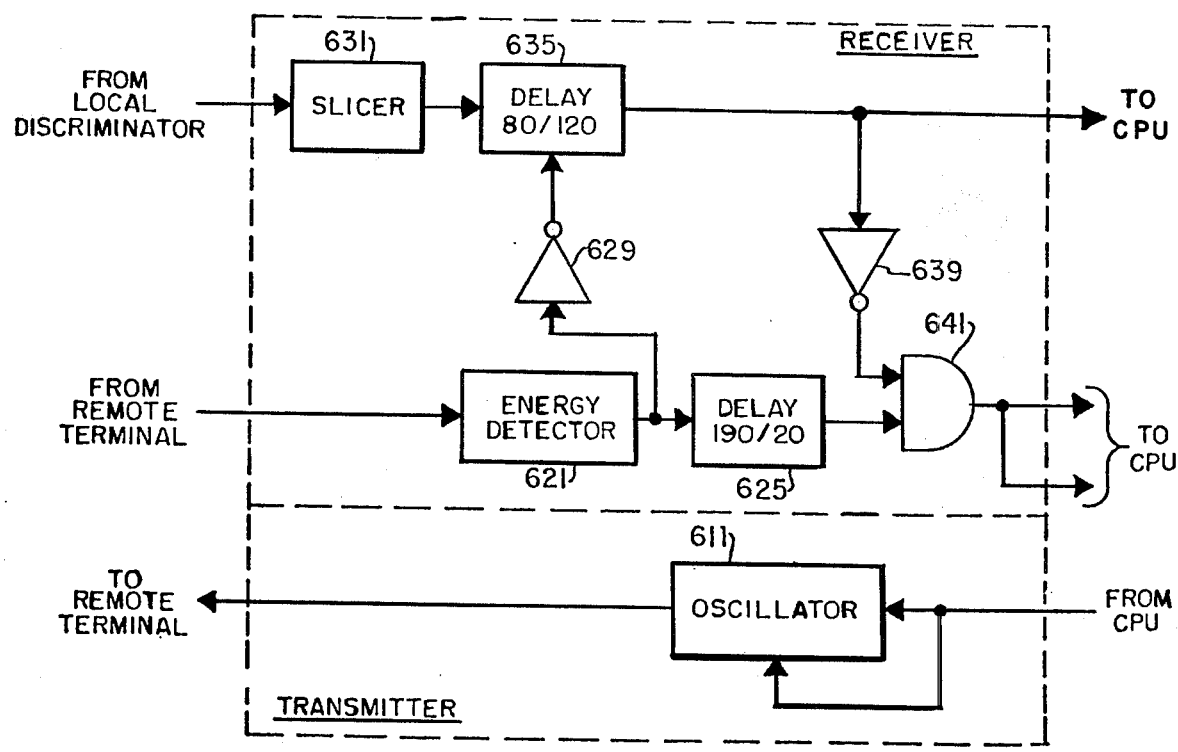
FIG. 6 is a block diagram of portions of a local FDM transmitter/receiver of a second illustrative embodiment of our invention.

As indicated above, one invention may also be practiced using apparatus in which a RING signal is transmitted to the CPU. FIG. 5 illustrates portions of a remote FDM transmitter/receiver adapted for RING signaling; and FIG. 6 illustrates a local FDM transmitter/receiver in such a system. The elements of the apparatus of FIGS. 5 and 6 are the same as those of the apparatus of FIGS. 2 and 3 and bear the same numbers increased by 300. The apparatus of FIG. 5 differs from that of FIG. 2 in that the signal applied directly to AND gate 525 is a RING signal. The apparatus of FIG. 6 differs from that of FIG. 3 in that a lead from delay device 635 carries the RING signal to the CPU and that the DATA SET READY signal is derived from the output of AND gate 641 instead of one of its inputs.

Figure 7:
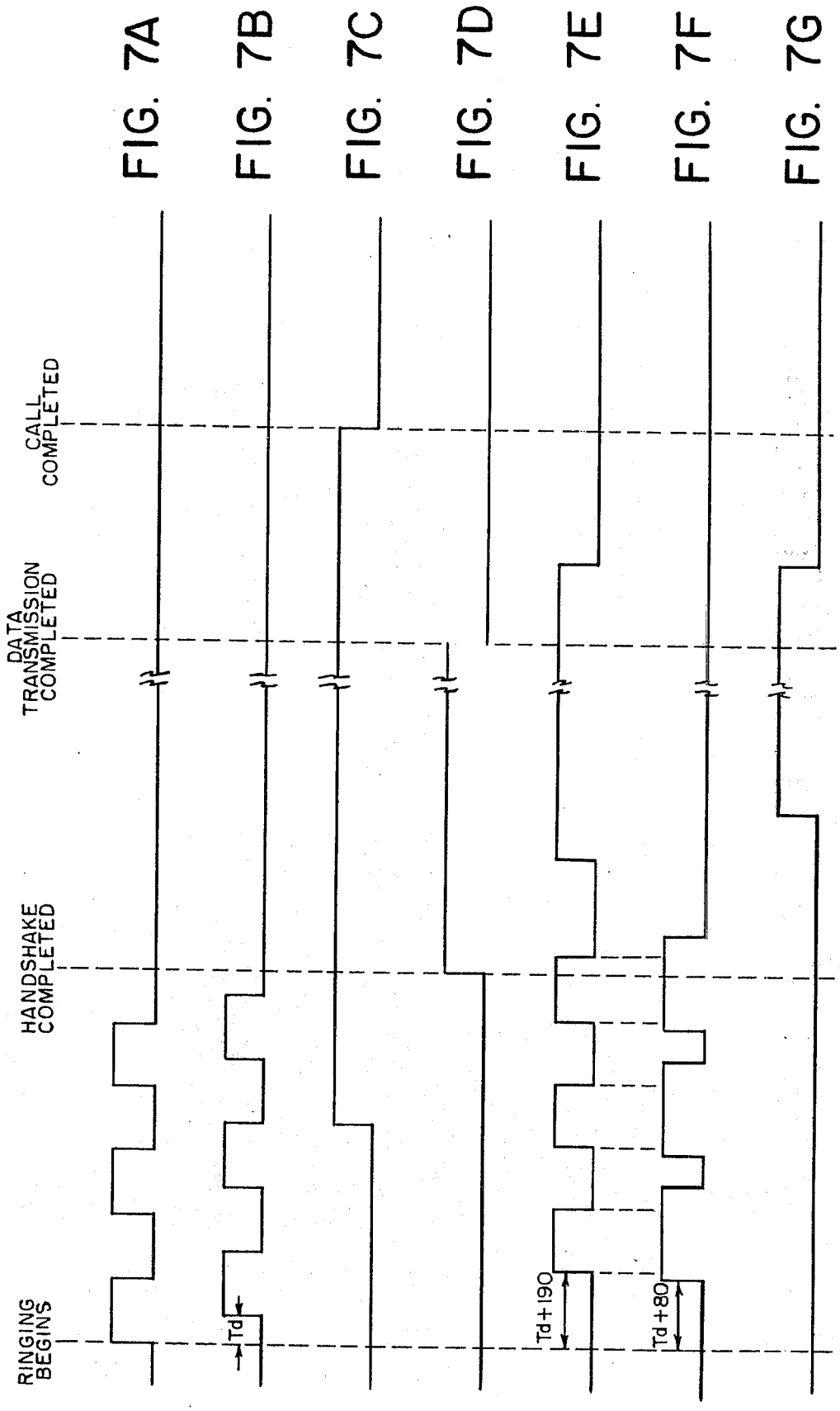
FIGS. 7A–7G depict waveforms useful in understanding the operation of the second illustrative embodiment of our invention.

The operation of the remote terminal FDM and the local FDM of FIGS. 5 and 6 may be understood with the aid of the waveforms shown in FIGS. 7A–7G. Initially, a RING signal shown in FIG. 7A is presented to the modem at the remote terminal. This signal comprises a series of three second pulses separated by two second intervals. The signal is applied to AND gate 525. Because no CARRIER DETECT signal is present at this time, AND gate 525 is enabled, and oscillator 529 is turned on during each three second pulse. The voltage of each such pulse is selected so that the output of oscillator 529 is the special frequency.

After a transmission delay, $T_d$, the special frequency signal as shown in FIG. 7B is detected in local FDM transmitter/receiver. The special frequency signal is formed by slicer 631 and delay device 635 into a RING signal that is applied from delay device 635 to the CPU. Simultaneously, the special frequency signal energy is detected in energy detector 621 and delay device 625. However, there is no output from AND gate 641 and therefore no CARRIER DETECT signal and no DATA SET READY signal during the reception of the RING signal because the rising signal time constants and the falling signal time constants of delay devices 625 and 635 are such that AND gate 641 is always disabled during reception of the RING signal. Specifically, the rising signal time constant of delay device 635 is sufficiently shorter than that of delay device 625 that the inverted output of delay device 635 disables AND gate 641 before any output from delay device 625 reaches it. In addition, the falling signal time constant of delay device 635 is sufficiently longer than that of delay device 625 that AND gate 641 remains disabled until after the output of delay device 625 is terminated.

Upon receiving the RING signal, the CPU responds with a DATA TERMINAL READY signal shown in FIG. 7C if it is prepared to receive the call. This turns on oscillator 611 and transmits a carrier signal to the remote FDM where it is detected by energy detector 511. After monitoring in delay device 515, the output of detector 511 is applied to the remote terminal modem as a DATA TERMINAL READY signal. This causes the call to be answered and the RING signal to be terminated.

Handshaking then commences; and when handshaking is completed, data transmission begins. The rest of the call and its termination proceed in the same fashion as a call that is initiated without RING signaling. For the convenience of the reader, the waveform indicating a data transmission is indicated at FIG. 7D, the output of delay device 625 is given in FIG. 7E, the RING signal from delay device 635 is given in FIG. 7F, and the CARRIER DETECT signal from AND gate 641 is given in FIG. 7G. Note that both the CARRIER DETECT signal and the DATA SET READY signal are derived from the output of AND gate 641.

The OUT OF SERVICE signal is used in the same fashion with either of the foregoing embodiments to indicate that the CPU is not available for a call. In effect, it is a busy signal. In the foregoing embodiments, the OUT OF SERVICE signal is transmitted from the local FDM transmitter/receiver to the remote FDM as a center frequency signal that is at least two seconds long. Thus, the apparatus for transmitting the OUT OF SERVICE signal is simply an oscillator; and the apparatus for detecting this signal is a center frequency detector and a delay device. Typically, the oscillator is the same oscillator as that used in FIGS. 3 and 6 to transmit the carrier signal representative of the DATA TERMINAL READY signal.

We prefer to use the OUT OF SERVICE signal to provide for testing of the remote terminal modem and the FDM. Accordingly, the center frequency detector and the delay device may be similar to apparatus described in copending patent application Ser. No. 170,428, now U.S. Pat. No. 3,743,938 filed Aug. 11, 1971 by S. J. Davis, entitled "Closed Data Loop Test Method and Apparatus for Data Transmission Modem," and assigned to General DataComm Industries, Inc., which is hereby incorporated by reference. Additional apparatus necessary for such testing is detailed in U.S. Pat. No. 3,655,915, now U.S. Pat. No. Re. 27864 issued to R. A. Liberman and S. J. Davis on "Closed Loop Test Method and Apparatus for Duplex Data Transmission Modem," which also is hereby incorporated by reference. It will be understood by those skilled in the art, that modem 20 of application Ser. No. 170,428 corresponds to the remote FDM transmitter/receiver 36 described above and that modem 20 of U.S. Pat. No. 3,655,915 corresponds to remote modem 35 described above.

If desired, testing of both the modem and the FDM in the remote terminal may be accomplished automatically by inserting a counter between Remote Dataloop Respond Control flip-flop 61 and solenoid 62 of FIG. 2 of application Ser. No. 170,428 and by connecting loop test terminal 78 of FIG. 2 of U.S. Pat. No. 3,655,915 to a point between this counter and Remote Dataloop Respond Control flip-flop 61. A remote terminal in which this is done is illustrated schematically in FIG. 8. This terminal comprises a first modem having a first modulator 811 and a first demodulator 821 that correspond to the remote FDM transmitter and the remote FDM receiver of FIGS. 2 and 5 and a second modem having a second modulator 861 and a second demodulator 871 that correspond to the transmitter and receiver of the remote terminal modem 35 of FIG. 1.

To detect an OUT OF SERVICE signal, a slicer 831, a delay device 833, and a control flip-flop 835 are connected to demodulator 821. This apparatus corresponds to modem receiver 20A, slicer 55, integrator 56, and Dataloop Respond Control 61 of application Ser. No. 170,428 and operates in the fashion described therein.

Figure 8:
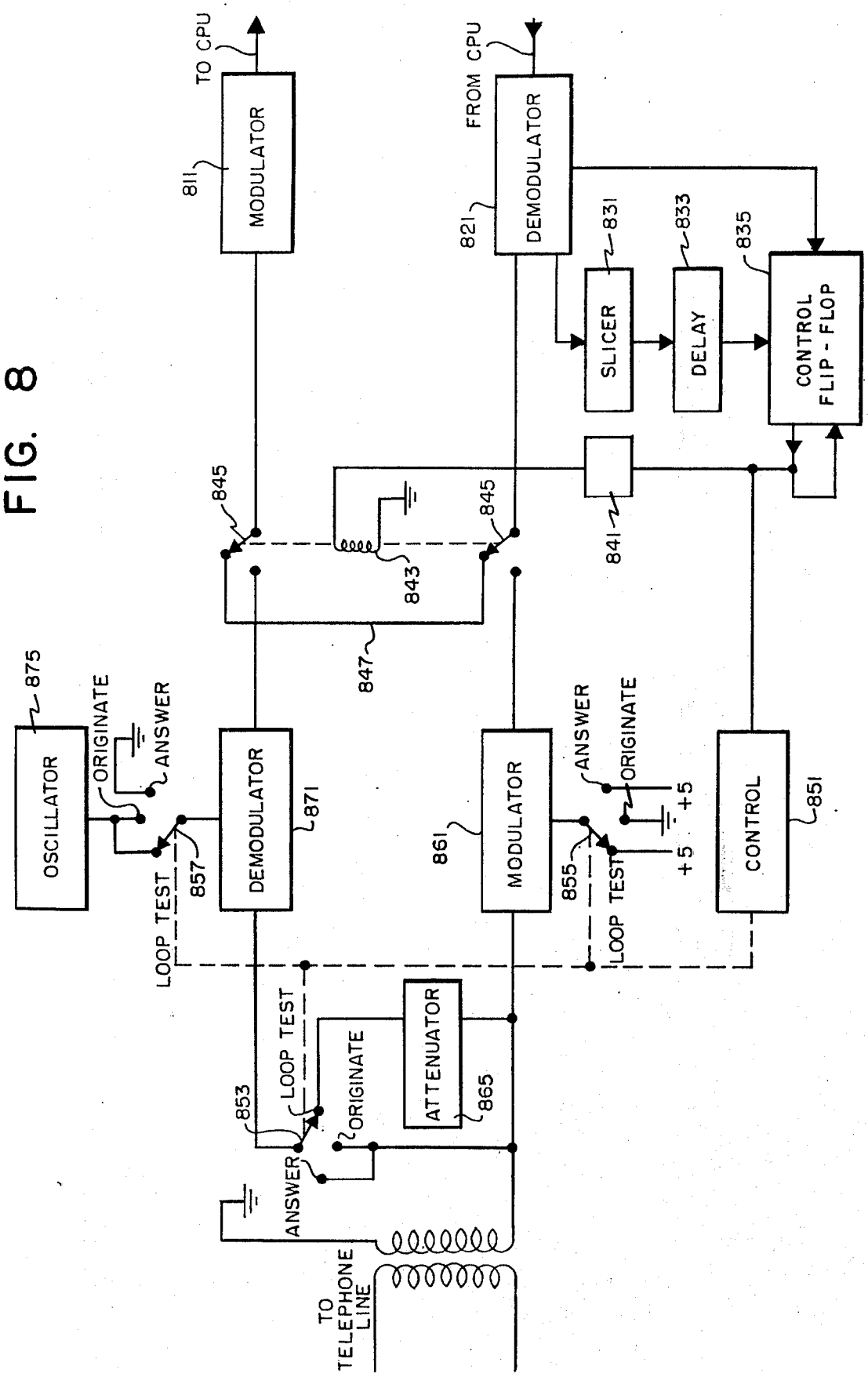
FIG. 8 is a block diagram of illustrative testing circuitry in a remote terminal of our invention.

The output of control flip-flop 835 is an ON-OFF signal that is applied to a control means 851 and a counter 841. The output of counter 841 is applied to a solenoid 843 that controls the position of a double-pole, double-throw switch 845. As shown in FIG. 8, in its test position switch 845 closes data test loop 847 and simultaneously disconnects the input terminal of modulator 811 and the output terminal of demodulator 821 from the second modem.

In response to an ON signal from control flip-flop 835, control means 851 establishes a test condition in the second modem. In this condition, a test loop is connected from the output terminal of modulator 861 through attenuator 865 to the input terminal of demodulator 871 and modulator 861 is forced to operate in one of the answer or originate modes while demodulator 871 operates in the other. The test loop is established by a switch 853 that interconnects the output of modulator 861 to the input of demodulator 871 via attenuator 865. Modulator 861 is caused to operate, for example, in the answer mode by using switch 855 to apply to it the same voltage that is used for the answer mode. This voltage controls the frequency of an oscillator (not shown) in modulator 861. Demodulator 871 is caused to operate in the originate mode by using switch 857 to apply to it the same frequency from oscillator 875 that is used for the originate mode. Further details on this portion of the remote terminal are set forth in U.S. Pat. No. 3,655,915. As will be apparent upon examination of that patent, considerable apparatus described therein has been left out of FIG. 8 for purposes of clarity.

To test the remote terminal of FIG. 8, a two second center frequency OUT OF SERVICE signal is applied from the CPU. This produces an output from control flip-flop 835 that latches in the ON state. This output is applied to control means 851 to cause it to put the second modem in its test condition by closing the test loop through attenuator 865, switching modulator 861 to the answer mode and switching demodulator 871 to the originate mode. As long as a carrier signal is detected in demodulator 821, the output of control flip-flop 835 remains latched in the ON state that causes the test condition in the second modem. When the carrier signal fails, a reset signal is generated that resets control flip-flop 835 and changes its output to the OFF state. This causes control means 851 to switch the second modem out of the test condition.

Each ON-OFF cycle of the output of control flip-flop 835 is counted by counter 841. For every other ON signal output from control flip-flop 835, the output of counter 841 is such that it closes test loop 847. Because the closing of test loop 847 disconnects modulator 861 and demodulator 871, only modulator 811 and demodulator 821 are available for testing when test loop 847 is closed. As a result, both the first and second modems are connected for testing during one ON signal output from control flip-flop 835; and just the first modem is so connected during the next ON signal. This makes it possible to isolate some malfunctions in the data communication system.

CONCLUSION

From the foregoing it is evident how dial access control signals may be transmitted as frequency-modulated signals. A special frequency signal is used to transmit a RING or DATA SET READY signal provided no CARRIER DETECT signal is received at the FDM transmitter. The CARRIER DETECT signal is transmitted as a carrier signal. At the FDM receiver, both a special frequency detector and a signal energy detector are used to form output signals. The RING signal is derived from the output of the special frequency detector. The CARRIER DETECT signal is formed by using the output of the special frequency detector to inhibit the output of the signal energy detector. By using appropriate rising signal and falling signal time constants for delays in the special frequency detector and the signal energy detector, the resulting signal is similar to the CARRIER DETECT signal. If no RING signal is transmitted, a DATA SET READY signal is derived from the output of the signal energy detector; and if a RING signal is transmitted, a DATA SET READY signal is used that is the same as the CARRIER DETECT signal. DATA TERMINAL READY and OUT OF SERVICE signals are transmitted as carrier signals and center frequency signals respectively. Advantageously, the OUT OF SERVICE signal may be used with other apparatus to initiate testing of remote FDM transmitter/receivers and remote modems.

It will be apparent to those skilled in the art that various modifications may be made to the preferred embodiments described and illustrated herein without departing from the invention as defined in the claims.

What is claimed is:

1. In a data transmission terminal comprising:
  a first modem comprising:
    a first demodulator with an input terminal for receiving a frequency-modulated signal and an output terminal to which are supplied data signals demodulated from said frequency-modulated signal; and
    a first modulator with an input terminal for receiving digital data signals and an output terminal to which is supplied a frequency-modulated signal representative of said digital data signals; and
  a second modem comprising:
    a second demodulator with an input terminal for receiving a frequency-modulated signal and an output terminal to which are supplied data signals demodulated from said frequency-modulated signal, said output terminal being connected to the input terminal of the first modulator; and
    a second modulator having an input terminal for receiving digital data signals and an output terminal to which is supplied a frequency-modulated signal representative of said digital data signals, said input terminal being connected to the output terminal of the first demodulator,
  a method of closed loop testing the operation of said first and second modems from the frequency-modulated signal side of the first modem comprising:
    sensing a particular fequency-modulated signal supplied to the first demodulator and producing in response thereto a test initiate signal;
    detecting an interruption in signals applied to the first demodulator and producing in response thereto a reset signal;
    operating the second modulator in one of the originate or answer modes in response to said test initiate signal;
    operating the second demodulator in the other of said originate or answer modes in response to said test initiate signal;
    connecting the output of the second modulator to the input of the second demodulator in response to said test initiate signal;
    applying cycles of said test initiate and reset signals to a counter; and
    in response to the output of said counter, interconnecting the output terminal of the first demodulator and the input terminal of the first modulator while disconnecting the first modem from the second modem, the output of the counter being such that said interconnecting does not take place during all cycles of the test initiate and reset signals.

2. The method of claim 1 wherein the interconnecting of the output terminal of the first demodulator and the input terminal of the first modulator occurs on alternate cycles of the test initiate and reset signals.

3. The method of claim 1 further comprising the step of attenuating the output of the second modulator connected to the input of the second demodulator.

4. A data transmission terminal comprising:
  a first modem comprising:
    a first demodulator with an input terminal for receiving a frequency-modulated signal and an output terminal to which are supplied data signals demodulated from said frequency-modulated signal; and
    a first modulator with an input terminal for receiving digital data signals and an output terminal to which is supplied a frequency-modulated signal representative of said digital data signals;
  a second modem comprising:
    a second demodulator with an input terminal for receiving a frequency-modulated signal and an output terminal to which are supplied data signals demodulated from said frequency-modulated signal, said output terminal being connected to the input terminal of the first modulator; and
    a second modulator having an input terminal for receiving digital data signals and an output terminal to which is supplied a frequency-modulated signal representative of said digital data signals, said input terminal being connected to the output terminal of the first demodulator; and
  means for closed loop testing the operation of said first and second modems from the frequency-modulated signal side of the first modem comprising:
    means for sensing a particular frequency-modulated signal supplied to the first demodulator and producing in response thereto a test initiate signal;
    means for detecting an interruption in signals applied to the first demodulator and producing in response thereto a reset signal;
    control means responsive to said test initiate and reset signals for energizing the second modulator for operation in one of the originate or answer modes, for energizing the second demodulator for operation in the other of said originate or answer modes, and for connecting the output of the second modulator to the input of the second demodulator;

means for counting cycles of said test initiate and reset signals; and switch means responsive to the output of said counting means for interconnecting the output terminal of the first demodulator and the input terminal of the first modulator while disconnecting the first modem from the second modem, the output of said counting means being such that said interconnecting does not take place during all cycles of the test initiate and reset signals.

5. The apparatus of claim 4 wherein the means for connecting the output of the second modulator to the input of the second demodulator includes an attenuator.

6. In a data transmission terminal comprising:
a first modem comprising:
a first demodulator with an input terminal for receiving a frequency-modulated signal and an output terminal to which are supplied data signals demodulated from said frequency-modulated signal; and
a first modulator with an input terminal for receiving digital data signals and an output terminal to which is supplied a frequency-modulated signal representative of said digital data signals;
and a second modem comprising:
a second demodulator with an input terminal for receiving a frequency-modulated signal and an output terminal to which are supplied data signals demodulated from said frequency-modulated signal, said output terminal being connected to the input terminal of the first modulator; and
a second modulator having an input terminal for receiving digital data signals and an output terminal to which is supplied a frequency-modulated signal representative of said digital data signals, said input terminal being connected to the output terminal of the first demodulator, a method of closed loop testing the operation of said first and second modems from the frequency-modulated signal side of the first modem comprising:

sensing a first signal supplied to the first demodulator and producing in response thereto a test initiate signal;

sensing a second signal supplied to the first demodulator and producing in response thereto a reset signal;

operating the second modulator in one of the originate or answer modes in response to said test initiate signal;

operating the second demodulator in the other of said originate or answer modes in response to said test initiate signal;

connecting the output of the second modulator to the input of the second demodulator in response to said test initiate signal;

applying cycles of said test initiate and reset signals to a counter; and in response to the output of said counter, interconnecting the output terminal of the first demodulator and the input terminal of the first modulator while disconnecting the first modem from the second modem, the output of the counter being such that said interconnecting does not take place during all cycles of the test initiate and reset signals.

7. The method of claim 6 further comprising the step of attenuating the output of the second modulator connected to the input of the second demodulator.

* * * * *